United States Patent Office 3,067,022
Patented Dec. 4, 1962

3,067,022
METHOD FOR THE CONTROL OF
UNDESIRABLE VEGETATION
Joyce D. Nault, Garden Grove, Calif., assignor to The
Dow Chemical Company, Midland, Mich., a corporation of Delaware
No Drawing. Filed June 20, 1960, Ser. No. 37,089
3 Claims. (Cl. 71—2.3)

This invention is concerned with the suppression of the growth of undesirable vegetation and is particularly directed to a composition and method for the suppression of the growth of the germinant seeds and emerging seedlings of many undesirable weed species.

It is an object of the present invention to provide a new method for the suppression and control of the growth of undesirable vegetation. A further object is to provide a method for the suppression of the growth of undesirable seeds and emerging seedlings and to thus improve the plant growing properties of soil. Another object is the provision of a novel composition adapted to be employed for the accomplishment of the new method of growth control. Other objects will become apparent from the following specification and claims.

According to the present invention, it has been discovered that the growth of many germinant seeds and emerging seedlings may be suppressed by exposing the germinant seeds and emerging seedling rootlets to the action of 3-pentyn-2-one or tetrolophenone. 3-pentyn-2-one is a mobile liquid boiling at 71.5° C. at 101 millimeters' pressure, and tetrolophenone a liquid material boiling at about 68° C. at 2 millimeters' pressure. The compounds are somewhat soluble in many organic solvents and water, and are adapted readily and conveniently to be distributed in soil or growth media. Such distribution or impregnation of the soil has been found to accomplish excellent controls of the growth of the seeds and emerging seedlings of many undesirable weed species, and to improve the plant growing properties of soil and the growth of crops subsequently planted in the treated soil.

The distribution of a growth inhibiting amount of 3-pentyn-2-one or tetrolophenone in growth media is essential for the practice of the present invention. In general, good results are obtained when a dosage of toxicant is supplied in the amount of from about 2 to 300 parts or more by weight per million parts by weight of the media. In applications to soil, good results are obtained when the compound is distributed at a rate of from about 1.5 pounds to 200 pounds or more per acre and through such a cross section of the soil as to provide for the presence therein of an effective concentration of the treating agent. In such applications, it is desirable that the compound be distributed to a depth of at least 0.25 inch. Incidental to such excellent controls of undesirable weeds, these same concentrations have been found to give good controls of invertebrate organisms which attack plant roots.

The methods of the present invention is carried out by applying to and mixing with growth media the unmodified 3-pentyn-2-one or tetrolophenone. However, the present method also embraces the employment of a liquid or dust composition containing the toxicants. In such usage, the active compounds are modified with one or a plurality of additaments including water or other liquid carriers, surface active dispersing agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the compounds in the growth media conveniently may be supplied per acre treated in from 40 to 27,000 gallons or more of the liquid carrier or in from about 50 to 2,000 pounds of the inert solid carrier.

The exact concentration of the active compounds to be employed in compositions for the treatment of growth media may vary provided the required dosage of effective agent is supplied. The concentration of toxicant in liquid compositions employed to supply the desired dosage generally is from about 0.01 to 50 or even up to 90 percent by weight. In dusts, the concentration of toxicant may be from about 1 to 20 percent by weight. In compositions to be employed as concentrates, the toxicant may be present in a concentration of from about 5 to 98 percent by weight.

Liquid compositions containing the desired amount of the 3-pentyn-2-one or tetrolophenone are prepared by dissolving the toxicants in an organic liquid such as acetone, toluene, methylene chloride, chlorobenzene and petroleum distillates or by dispersing the toxicant in water with or without the aid of a suitable surface active dispersing agent such as an ionic or non-ionic dispersing and emulsifying agent. The preferred organic solvent carriers are those which are adapted to accomplish the penetration and impregnation of the soil with the toxicant and are of such volatility they evaporate from the soil and leave little permanent residue therein.

z-f ofls-ea cmfwyp shrdl

The aqueous compositions may contain one or more water-immiscible solvents for the toxicants. In such compositions, the carrier comprises an aqueous emulsion, i.e. a mixture of water-immiscible solvent, emulsifying agent and water. The choice of dispersing and emulsifying agent and the amount thereof employed is dictated by the nature of the composition type and by the ability of the agent to facilitate the dispersion of the toxicant in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. In such compositions, the surface active agents are usually employed in the amount of from 1 to 20 percent by weight of the combined weight of the surface active agent and the ketone compound.

A preferred embodiment of the invention consists of a petroleum distillate solution of 3-pentyn-2-one or tetrolophenone. The petroleum distillates to be employed in such embodiment are carefully cut portions boiling almost entirely under 400° F. at atmospheric pressure, having a flash point above 80° F. and leaving very small residues on evaporation. These compositions are characterized by having excellent penetrating properties and by being of low fire hazard to the shipper and user.

In the preparation of dust compositions, the 3-pentyn-2-one or tetrolophenone are dispersed in and on a finely divided inert solid such as talc, chalk, gypsum and the like. In such operations, the carrier is mechanically ground with the compounds or wet with a volatile organic solvent solution thereof. Similarly, dust compositions containing the compounds may be prepared from bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be applied for the control of the growth of vegetation. Also such concentrate dust compositions may be dispersed in water with or without the aid of a dispersing agent to form spray mixtures.

When operating in accordance with the present invention, growth inhibiting amounts of the 3-pentyn-2-one or tetrolophenone compounds or a composition containing the toxicants are dispersed in any convenient fashion in soil or other growth media, i.e., by simple mixing with the growth media, by applying to the surface of soil and thereafter dragging or discing into the soil to the desired depth, or by employing a liquid carrier to accomplish the penetration and impregnation. The application of the spray and dust compositions may be carried out by conventional methods, e.g., with power dusters, boom and hand sprayers and spray dusters.

In a further method, the distribution may be accomplished by introducing the toxicants in the water employed to irrigate the soil. In such procedure, the amount of water may be varied in accordance with the porosity and water holding capacity of the soil in order to obtain the desired depth of distribution of the toxicant.

The following examples illustrate the invention but are not to be construed as limiting the same:

*Example 1*

50 parts by weight of 3-pentyn-2-one, 45 parts by weight of xylene and 5 parts by weight of a dimeric alkylated aryl polyether alcohol (Triton X–155) are mixed together to prepare a concentrate composition in the form of a water dispersible composition.

Also, 90 parts by weight of tetrolophenone and 10 parts by weight of a sorbitan monolaurate polyoxyethylene derivative (Tween 20) are mechanically mixed together to prepare a water dispersible concentrate composition.

These compositions are adapted to be dispersed in water to produce aqueous compositions having very desirable wetting and penetrating properties. The latter compositions are adapted to be employed to treat soil and distribute the active compounds therein in effective concentrations.

*Example 2*

An acetone solution containing about 2.5 grams of 3-pentyn-2-one per 10 milliliters of acetone is dispersed in water to prepare aqueous compositions containing 40, 80 and 160 parts by weight of toxicant per million parts by weight of ultimate mixture. These compositions are employed for the treatment of areas of sandy loam soil of good nutrient content which are planted with the seeds of rape and oats. In the treating operations, the compositions are applied to the soil as a soil drench and at a rate of about 5.8 acre inches of aqueous composition per acre to supply 50, 100 and 200 pounds, respectively, of 3-pentyn-2-one per acre. These amounts correspond to dosages of about 12.5, 25 and 50 parts by weight of 3-pentyn-2-one per million parts by weight of soil. About 7 days after treatment, sections of soil are taken from the treated areas and the sections placed in seed beds and maintained under conventional greenhouse practices with regard to light, temperature and water. In an exactly analogous fashion, soil samples are taken from areas of similarly planted but untreated soil, and the samples placed in seed beds to serve as checks.

At regular intervals, the seed beds are examined to determine what control of the growth of seeds and emerging seedlings had been obtained. From the observations, there is found a substantially complete kill of seeds and emerging seedlings in the soil at all treatment dosages with 3-pentyn-2-one compound. At the time of the observations, the untreated check beds are found to support abundant stands of vigorously growing rape and oat plants.

*Example 3*

3-pentyn-2-one is dispersed in water to prepare an aqueous composition containing 187 parts by weight of toxicant per million parts by weight of ultimate mixture. This composition is employed for the treatment of soil for the control of the growth of the seeds and emerging seedlings of water grass and oats. In such operations, the composition is employed to treat soil areas which had been prepared and seeded with the named plant species. In the treating operations, the composition is applied to the areas as a soil drench and at a rate of ⅓ acre inch of aqueous composition per acre to supply a substantially uniform dosage of 75 pounds of 3-pentyn-2-one per acre foot of soil. This dosage corresponds to about 18 parts by weight of 3-pentyn-2-one per million parts by weight of soil. Other areas similarly prepared and seeded with the named plant species are left untreated to serve as checks.

At regular intervals, the seed beds are examined to ascertain what control of the growth of seeds and emerging seedlings are obtained. The observations showed that the 3-pentyn-2-one compound gave a 100 percent kill of the seeds and emerging seedlings of water grass and oats in the treated soil. At the time of the observations, there is found an abundant stand of rapidly growing water grass and oats in the untreated check beds.

*Example 4*

An acetone solution containing 0.2 gram of tetrolophenone per milliliter of acetone is dispersed in water to prepare an aqueous composition containing 200 parts by weight of toxicant per million parts by weight of ultimate mixture. This composition is employed for the treatment of areas of sandy loam soil of good nutrient content which are planted with the seeds of rape and oats. In the treating operations, the composition is applied to the soil at a rate of about ½ acre inch of aqueous composition per acre to supply in the soil about 50 parts by weight of tetrolophenone per million parts by weight of soil. Other areas similarly prepared and seeded with the named plant species are left untreated to serve as checks.

At regular intervals, the seed beds are examined to ascertain what control of the growth of seeds and emerging seedlings are obtained. The observations show that the tetrolophenone compound gives a substantially complete kill of the seeds and emerging seedlings of rape and oats in the treated soil. At the time of the observations there is found luxurient stands of vigorously growing rape and oats in the untreated check areas.

*Example 5*

3-pentyn-2-one is dispersed in water to prepare an aqueous composition containing about 375 parts by weight of toxicant per million parts by weight of ultimate mixture. This composition is similarly employed to treat soil for the control of the growth of the seeds and emerging seedlings of cotton, grass, tomato and crab grass. In such determinations, the composition is employed to treat soil areas which have been prepared and seeded with the named plant species. In the treating operations, the compositions are applied to the areas as a soil drench and at a rate of about ⅓ acre inch of aqueous composition per acre to supply a substantially uniform dosage of 150 pounds of toxicant per acre foot of soil. This dosage corresponds to about 37 parts by weight of 3-pentyn-2-one per million parts by weight of soil. Other areas similarly prepared and seeded are left untreated to serve as checks.

At regular intervals, the seed beds are examined and observations made to determine the control of the growth of seeds and emerging seedlings. The observations show a substantially complete kill of the seeds and emerging seedlings of cotton, rape, tomato and crab grass in the beds treated with the 3-pentyn-2-one compound. At the time of the observations, the check beds are found to support lush stands of cotton, rape, tomato and crab grass.

*Example 6*

3-pentyn-2-one is dissolved in a petroleum hydrocarbon fraction (Stoddards Solvent) to produce a composition having a flash point greater than 100° F. and containing about 0.55 pound of toxicant per 100 gallons of solvent. The hydrocarbon employed has a boiling range of from 312°–390° F. and a flash point of about 116° F. This composition is adapted to be employed to distribute the 3-pentyn-2-one compound in soil in effective concentrations.

I claim:

1. A method which comprises applying to and mixing with a growth medium infested with the seeds of plants a growth inhibiting amount of a member of the group consisting of 3-pentyn-2-one and tetrolophenone.

2. A method which comprises the step of contacting the seeds of plants while positioned in a growth medium with a growth inhibiting amount of a member of the group consisting of 3-pentyn-2-one and tetrolophenone.

3. A method for improving the plant growing properties of soil which comprises impregnating soil infested with the seeds of plants with a member of the group consisting of 3-pentyn-2-one and tetrolophenone in the amount of at least 2 parts by weight per million parts by weight of soil.

References Cited in the file of this patent

UNITED STATES PATENTS 2,905,588 Youngson ------------- Sept. 22, 1959

OTHER REFERENCES

Heilmann et al.: Chemical Abstracts, vol. 51, column 10369(1) (1957).

Bharucha: J. Chem. Soc., 1956, pages 2446–7.